J. D. BROWN.
Lantern.
No. 28,450.
Patented May 29, 1860.
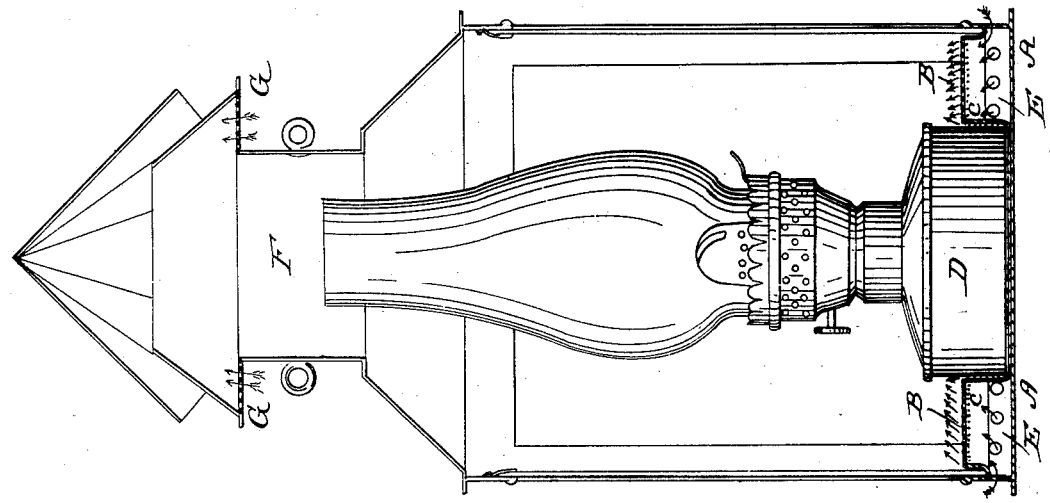
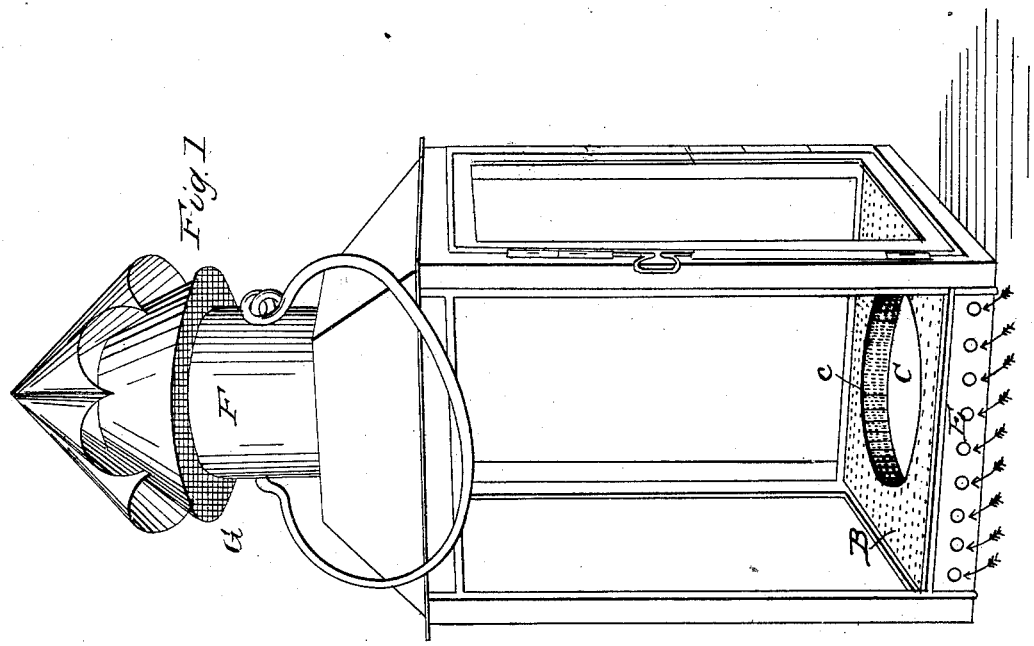
Witnesses
James H. Gridley
John W. Chute
Inventor
John D. Brown
by Knight Brothers Attys

UNITED STATES PATENT OFFICE.

JOHN D. BROWN, OF CINCINNATI, OHIO.

LANTERN.

Specification of Letters Patent No. 28,450, dated May 29, 1860.

*To all whom it may concern:*

Be it known that I, JOHN D. BROWN, of Cincinnati, Hamilton county, Ohio, have invented a certain new and useful Improvement in Lanterns; and I do hereby declare the following to be a full, clear, and exact description of the same, reference being had to the accompanying drawings, making part of this specification.

My said improvement relates to a construction of lantern adapted to contain a coal oil lamp, the draft passages being so protected—while preserving ample area—as to neutralize the effect of any local draft.

In the accompanying drawings, Figure 1, is a perspective view of a lantern which embodies my improvement. Fig. 2, is a vertical section thereof.

Elevated slightly above the bottom A is a perforated floor B, containing a central recess C whose vertical sides $c$ are also perforated. This recess is of such dimensions as to securely hold the lamp D, while its perforations freely pass the draft air. The space below the floor B receives external air through apertures E in the lantern frame. The perforations of the floor are so small in proportion to the burner and in proportion to the whole area of the floor; while their number and aggregate area are so large as to effectually prevent any local currents of air and yet admit an ample volume for the demands of combustion. In this respect the present invention is essentially distinct from the numerous lamps having perforated or gauze screens, which screens are in no instance known to me of sufficient area to admit of such relatively small draft apertures as to be exempt from flickering in the open air. On the contrary the relative area of screen is so small that the comparative largeness of the apertures makes the flame liable to flickering and extinction by a mere movement of the lamp through the air.

My invention also differs essentially from previously existing lanterns, constructed with perforated floors, the perforations of which are not extended uniformly over the entire surface of the floor. The chimney F projects somewhat in the form of a cowl, so as to present a horizontally projecting portion G, protected by a finely perforated plate or gauze similar to that which composes the floor B.

The following is what I claim as new and of my invention as an improvement in lanterns:

The recessed floor B C, formed with minute perforations over the entire surface of its upper portion B and the vertical sides $c$ of the recess; in the described combination with the imperforate floor A, apertures E, and lamp D, the whole being constructed and arranged in the manner and for the purposes set forth.

In testimony of which invention, I hereunto set my hand.

JOHN D. BROWN.

Witnesses:
GEO. H. KNIGHT,
OCTAVIUS KNIGHT.